Dec. 13, 1938.　　　J. R. SCHWENDEMAN　　　2,139,860
EDUCATIONAL DEVICE
Filed April 22, 1937　　　2 Sheets-Sheet 1
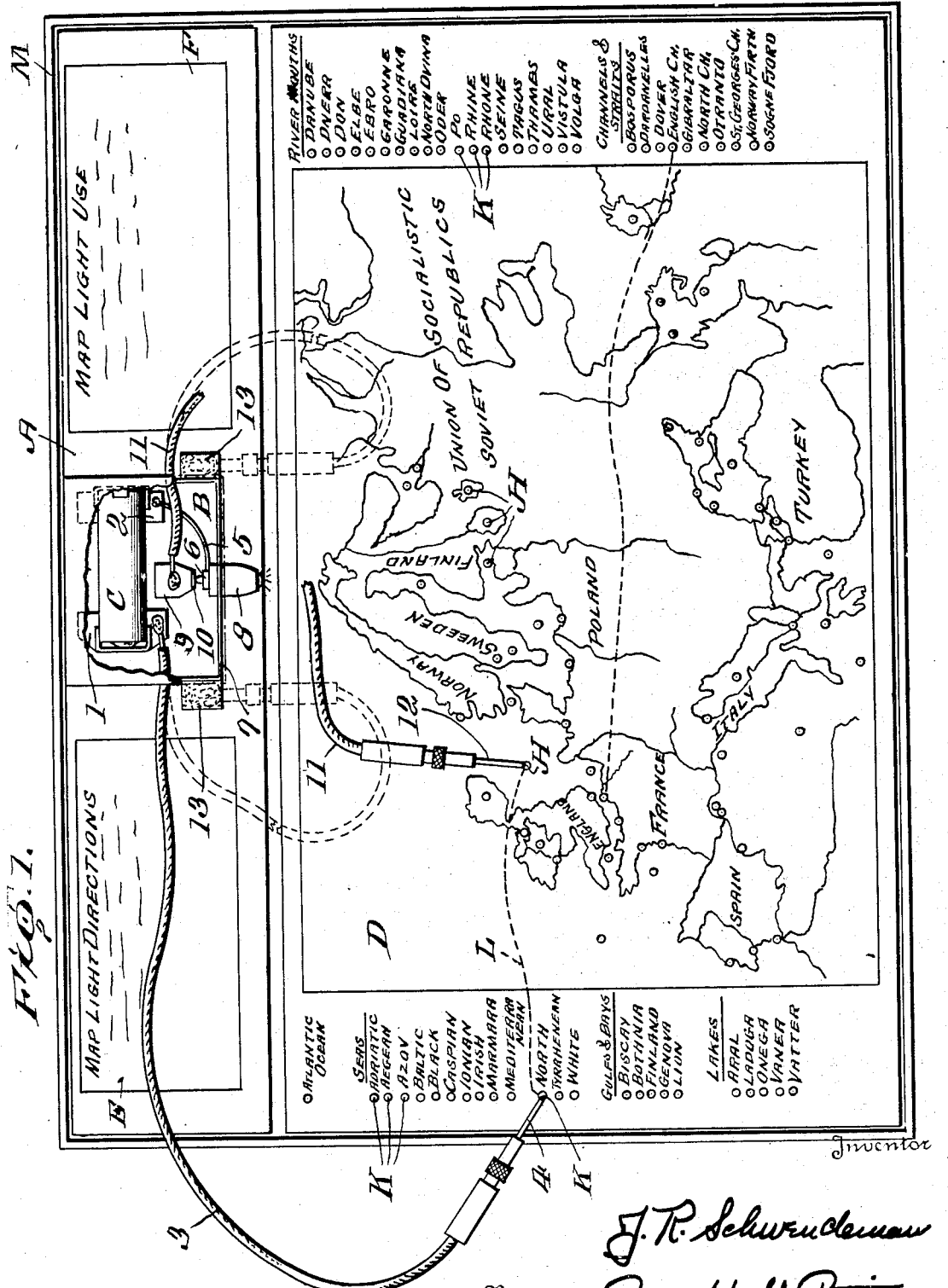

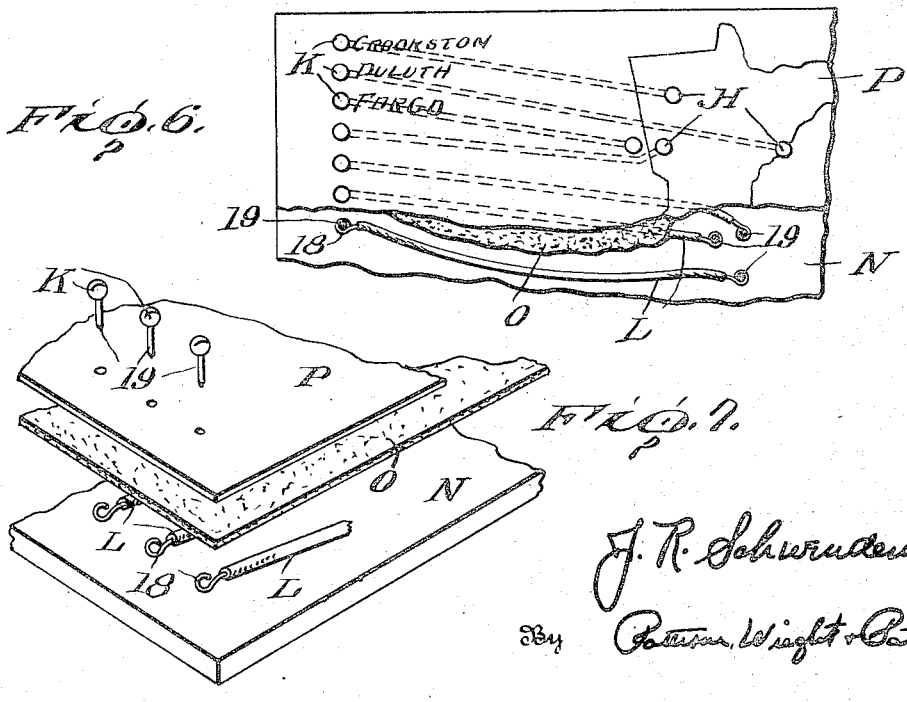

Patented Dec. 13, 1938

2,139,860

UNITED STATES PATENT OFFICE 2,139,860

EDUCATIONAL DEVICE

Joseph R. Schwendeman, Moorhead, Minn.

Application April 22, 1937, Serial No. 138,437

8 Claims. (Cl. 35—40)

The present invention relates to a novel and unique educational device the make-up and operation of which is particularly adapted for teaching factual information, and although the following description and accompanying drawings describe and illustrate the device in connection with teaching geography and particularly place geography, it is to be understood that this is only one of the embodiments the invention may take and that the principle upon which and around which the invention is built can be applied to teaching or ascertaining information of diversified natures.

The device is such that from an educational standpoint it provides correct psychological and pedagogical principles of learning for the individual. Additionally the device creates a sustained interest and a proper incentive in the individual using it with the result that the individual will make repeated effort and will, when he obtains the correct answer, thrill to the achievement. The individual using the device also will have the desire to excel and will rapidly obtain skill in obtaining the correct answer, which of course means that the student is absorbing and learning the particular information sought to be transmitted to him. The use of the device and the rapid and successful results create in the student the desire for further study through use of different informational plaques or boards in combination with the device.

In broad terms the invention as applied to the subject of geography comprises a plaque or board having a map thereon to which is applied a plurality of electrical contact points on the principal rivers, seas, bays, etc., which on the map are unnamed. On this same plaque or closely adjacent it the names of the rivers, seas, bays, etc. are listed and each provided with an electric contact which is electrically connected to the correct contact on the map. Suitable electric energy such as a battery is provided and to each side of the electrical source a pointer or lead is connected and the object to be obtained is to place one of said leads on a contact opposite one of the listed names adjacent the map and the other lead on that contact on the map which is on the particular geographical feature to which the first lead has been applied. An electric light is provided in association with the batteries and the leads and if the lead is applied to the proper map contact the electric circuit is closed and the light will be illuminated thus indicating that the user has correctly pointed to or selected the place or thing on the map corresponding to the place or thing to which the pointer has been applied on the list.

From the above broad description of the use of the device in connection with the subject of geography it will be at once readily apparent that the device can be used to teach any factual information by merely applying plaques of different natures and pertaining to different subjects. The plaques are readily removable, as will hereinafter appear, and any number or variety of them can be provided for use in connection with the electric circuit comprising the source of electric energy, electric light and pointer leads.

The device has been made sufficiently small to be particularly adaptable for individual use and manipulation and inasmuch as the device is automatic for self-instruction as well as interesting in use it is such as to encourage self-instruction by both children and adults. The completeness of the automatic manipulation of the device by the individual in learning factual information saves the time of the teacher or instructor and as the device is of a portable nature the student can use the same at home or carry it about at will for use where ever desired.

The construction of the device is such as to permit it to be made and sold at prices sufficiently moderate to permit and encourage possession of it for individual study and use and to this end I have devised a novel arrangement for electrically interconnecting the contacts on the plaques in a manner that this can be accomplished readily and at reasonable cost.

The numerous objects, advantages and novel features of construction of the device and its uniqueness will appear in more detail from the following description when read in the light of the accompanying drawings.

In the drawings:

Fig. 1 is a plan view illustrating the invention as an entirety as applied to the subject of geography.

Fig. 2 is a fragmentary vertical sectional view through the map or plaque appearing in Fig. 1.

Fig. 3 is a fragmentary rear plan view of the plaque appearing in Fig. 1 of the drawings.

Fig. 4 is a plan view with the map partly broken away and illustrating another method of providing electrical connections between the contact members on the map plaque.

Fig. 5 is a vertical sectional view taken on the line 5—5 of Fig. 4.

Fig. 6 is a fragmentary top plan view of a modified form of the invention a portion of the map being broken away to illustrate the electric wiring.

Fig. 7 is an enlarged detail strung-out perspective view of the construction appearing in Fig. 6 of the drawings.

Referring now to Figs. 1 and 2 of the drawings, A designates a suitable base member such as heavy cardboard or the like upon which is mounted a suitable housing or box B within which is positioned a small battery C such as are commonly used in flash lights.

The battery is retained in suitable brackets or clip-like members 1 and 2 which have conducting contact with the two poles of the battery as clearly illustrated. From one pole of the battery, as for instance the clip 1, extends a flexible wire 3 carrying at its end a metallic pointer or tip 4 while from the other clip 2 which has contact with the opposite pole of the battery extends a lead wire 5 having suitable connection with a base 6 of an electric light which extends through the front wall 7 of the box and is within a suitable protector 8. The base of this light has electrical contact with a metallic bracket 9 the upstanding end 10 of which is of a resilient nature and holds the light within its globe covering 8. From this bracket 9 extends a flexible lead wire 11 which terminates in a tip or pointer 12 similar to the hereinbefore referred to pointer 4.

When the pointers are not in use they are inserted into suitable retainers 13 carried either by the box B or the base A and they are illustrated as being so positioned in dotted line on Fig. 1 of the drawings. These retainers form no specific part of the present invention but I have found that by making them of rubber and providing them with a suitable opening for the reception of the tips they serve exceptionally well as retainers for the pointers when they are not in use.

Printed or otherwise suitably applied to the base A or at a point adjacent to the box B or the map plaque D are directions for the operation and use of the device and these are designated at E and F respectively.

The plaque D is separate and distinct from the other equipment and apparatus which has already been described and as a consequence plaques of different kinds can be readily interchanged for use in connection with the pointers and electric light.

On its front face the plaque illustrated in Fig. 1 of the drawings carries a map of Europe and this particular plaque is for teaching the water bodies and waterways of Europe to the student. Scattered over the map and extending through it are a plurality of headed metallic pins or nails H which are positioned on the map on the different water bodies and waterways. At the margins of the plaque at either side of the map illustration are listed the different water bodies such as the seas, gulfs and bays and lakes and the different waterways such as river mouths, channels and straits. Opposite each of the names of the water bodies or waterways is positioned a headed metallic pin or nail K.

By reference to Figs. 2 and 3 of the drawings it will be seen that these pins or nails H and K extend entirely through the plaque and beyond its under side and that suitable wires L interconnect the proper pin or contact H with the proper pin or contact K. To facilitate the wiring of the plaque numerals are placed on the back of the plaque adjacent the protruding ends of the pins H and K such as is clearly illustrated in Fig. 3 of the drawings where the end 32 of a pin H is illustrated as being connected to the end 32 of a pin K. From this figure of the drawings it will be obvious that wires are extended between the protruding ends or pins bearing similar numbers. Electrical connection between the pin ends and the wires is obtained in this instance by soldering.

After the plaque has been completely made a suitable covering or shield 14 is applied to its under side to protect the wires 12.

In making the plaque the map and the printing can be applied directly to the heavy plaque board D or the map and the printing can be made on paper which can be cemented or otherwise suitably attached to the upper face of the plaque.

It will be obvious that normally the electric circuit is open but that when, as illustrated in Fig. 1 of the drawings, the pointer 4 is placed on the marginal contact K opposite the North Sea and the other pointer 12 placed on the contact H of the map which is in or on the North Sea, the electric circuit will be closed by the wire L which extends between these two particular contacts H and K and that the electric light 6 will be illuminated thus advising the student or user that he has pointed out the North Sea on the map. It will be equally obvious that if the pointer 12 is applied to any other contact H than the particular one on or in the North Sea that the electric light will not be illuminated.

As it is desirable to have a device of this kind portable in nature the plaque and the base carrying the box B and its associated paraphernalia is positioned within a suitable box or carrier M which can be provided with a suitable cover (not shown) which will permit the device to be transported without danger or injury. From the description thus far given it should be obvious that plaques of varying natures can be substituted for that illustrated. There could be map plaques arranged and devised to teach practically any and all factual information or the plaques could be devised to teach history or any other subject in which the student is interested or should be educated.

The device is particularly adapted for school use in that a correct answer is affirmed by silent signal. Any signal of a nature to cause a noise would be objectionable in a school room and annoying in the home. The silent affirmative signal upon a correct answer lends the device particular desirability in permitting the student to drill or practice on the particular subject to which the plaque is directed. The compactness of the device permits individual manipulation thus enabling individual study of the pupil without the assistance of an instructor.

In Figs. 4 and 5 of the drawings I have illustrated an optional and possibly a preferable form or method of providing electrical connection between the place contacts H and the name contacts K. In this figure of the drawings the map plaque comprises an illustration of the State of Minnesota and some of the adjacent territory of neighboring States. The names at the margin of the plaque are those of cities in Minnesota and in other adjacent States, while the contact pins H are positioned on or in the map at those places where the cities named are located.

In this instance in providing an electrical connection between the place contacts and the name contacts a sheet of metal foil or the like is utilized. An examination of Fig. 4 of the drawings will indicate that a piece of metal foil 15 extends from the name "Duluth" to the place contact 16 which represents that city. Other similar pieces of foil extend from the proper name contact to the proper place contact and these pieces of foil are so shaped or cut out that they are separated by spaces 17 so that there is no electrical engagement or contact between the several pieces of metal foil. The previously shaped metal foil pieces can be cemented or otherwise suitably secured in place upon the base N of the plaque or a solid piece of metal foil completely covering the base N can be secured in place and then cut into the proper configurations by a die. Another optional manner of assuring that there is no electrical connection between the several foil pieces is by impressing on the foil the proper pattern and impressing the pattern on the foil sufficiently deep to break the contact of the foil on the pattern line. Probably the most rapid way to secure the proper pattern for the foil pieces would be by either a stamp or rotary die.

Figs. 6 and 7 are illustrative of a further slight modification in the manner of wiring the plaque. In this instance actual electric wires are utilized, as has been described in respect to Figs. 1 to 3 of the drawings, but rather than soldering the ends of the wires L to the contact pins K and H the ends of the wires are formed into a loop as indicated at 18 in Fig. 6 of the drawings and the spike-like ends 19 of the pins pass through these loops or eyes and thus assure proper electrical contacting engagement between the pins and the wires.

In this form of the invention the map plaque D is illustrated as made up of a base N, a covering O and a paper P upon which the map is printed. The map-carrying paper is cemented or suitably otherwise secured to the covering O which covering is of course secured to the base N by the numerous contacts K and H.

I claim:

1. An improved educational device, comprising a support, a source of electricity on said support and an open electric circuit in combination with said source of electricity including an electric light and a pair of pointers connected to the ends of pliable wires electrically connected to the opposite poles of said current source, a plaque on said support and removable in respect to the same and in respect to the electric circuit and its cooperating parts, said plaque carrying electrical contacts each of which designates an educational fact, a list of said facts on said plaque, an electrical contact for each item in said list, and each fact contact in electric circuit with the proper contact listing said fact, whereby when the pointers are applied to a pair of contacts in circuit said upon circuit is closed and the electric light illuminated.

2. An improved educational device, comprising a support, an electric battery on said support, an open electric circuit including an electric light and pliable wires extending from the opposite poles of said battery and terminating in pointers, a plaque removable in respect to said base and carrying a map, electrical contact points positioned on said map and designating geographical features there illustrated, a name listing of said geographical features on said plaque adjacent said map, an electric contact point adjacent each name in said list, and each of said geographical feature contacts in electric circuit with the contact designating the name of said feature, whereby when the pointers are applied to a pair of contacts in circuit said open circuit is closed and the electric light illuminated.

3. An improved educational device, comprising a support, a baseboard and a plaque removably mounted on said support and removable in respect to one another, a housing on said baseboard, an electric battery within said housing, pliable wires extending from the opposite poles of said battery and terminating in pointers having metallic tips, an electric light in the open circuit formed by said wires, pointer receiving and securing means on said baseboard for retaining said pointers in separated relationship when the same are not in use, a map on said plaque, a list on said plaque and at each side of said map and containing the names of geographical features illustrated by said map, an electrical contact adjacent each name in said list. electrical contacts on said map designating by place the geographical features named in said list, electrical connection between each name contact and the proper geographical place contact on said map, whereby when the pointers are applied to a pair of contacts in circuit the electric light will be illuminated.

4. An improved device of the character described, comprising an open electric circuit including a source of electricity and an electric light and a pair of pointers having metallic tips and carried at the ends of pliable wires electrically connected to the opposite poles of said source of current, an informational plaque carrying electrical contacts each of which designates an educational fact, a listing by name of said facts on said plaque, an electrical contact for each item in said list, all of said contacts extending through and beyond the back of said plaque, a baseboard carrying on its face a plurality of strips of metallic foil, said plaque secured to said baseboard by said electrical contacts which pass through said metallic strips and into said baseboard, and said metallic strips so arranged that each of them provides an electrical connection between the proper name contact and the proper fact contact of said plaque, whereby when the pointers are applied to a pair of contacts in circuit said open circuit is closed and the electric light illuminated.

5. An improved article of the character described, comprising a plaque, a plurality of metallic contact points on the face of said plaque having ends extending through and beyond the back of said plaque, a base member to which said plaque is secured, a sheet of metallic foil between said base member and said plaque, the extending ends of said contact members having engagement with said foil strip, and a pattern cut from said foil strip to provide a plurality of strip pieces spaced apart to provide a plurality of independent foil strips one each of which extends from one contact point to a single remote contact point, for the purpose described.

6. An improved plaque for use with a device of the character described, said plaque comprising a face portion and a base to which said face is secured, a plurality of independent strips of foil interposed between said base and said face, a plurality of headed contact members extending through said face piece and penetrating said foil strips and said base for securing the face to the base, and said foil strips being of a design whereby each strip is penetrated only by the extending ends of a pair of contact points, for the purpose described.

7. An improved educational device, comprising a support, a housing on said support, an electric battery within said housing, an electric light mounted in and extending through one wall of said housing, an open electric circuit including said electric light, a pair of pointers connected to the ends of pliable wires electrically connected to the opposite poles of said battery, a plaque applicable to and removable from said support, said plaque carrying electrical contacts each of which designates an educational fact, a list of said facts on said plaque, an electrical contact for each item in said list, and current conductors on the rear of said plaque and connecting each fact contact with the proper contact listing said fact, whereby when the pointers are applied to a pair of electrically connected contacts said open circuit is closed and the electric light illuminated.

8. An improved plaque for use with an open electric circuit having therein a signal and a pair of pointers connected to the opposite poles of said circuit, said plaque comprising a base, a face carrying thereon a plurality of illustrated educational facts and a list of said facts, an electrical contact on each educational fact and an electrical contact on each item in said list of facts, a sheet of metallic foil interposed between said base and said face, cut-out portions in said sheet forming a plurality of separated foil strips, said contacts extending through the plaque face and securing the same in superposed relationship upon said strips of foil, and said cut-out portions in said foil sheet being of a design such that each foil strip is penetrated by and has electrical connection with only a contact point designating a fact and a contact point designating said fact in said list of facts, for the purpose described.

JOSEPH R. SCHWENDEMAN.